United States Patent Office 3,577,358
Patented May 4, 1971

---

3,577,358
ORGANIC ISOCYANATE-LIGNIN REACTION
PRODUCTS AND PROCESS
Thomas R. Santelli, Sylvania, and Robert T. Wallace, Toledo, Ohio, assignors to Owens-Illinois, Inc.
No Drawing. Continuation-in-part of application Ser. No. 846,822, Oct. 16, 1959. This application Feb. 10, 1967, Ser. No. 615,072
Int. Cl. C08g 22/44
U.S. Cl. 260—2.5                          16 Claims

ABSTRACT OF THE DISCLOSURE

New polymeric materials, such as synthetic resins, foamed cellular synthetic resins, and the like, are formed by reacting an organic polyisocyanate with lignin, preferably in the presence of varying amounts of catalysts, plasticizers, emulsifiers, solvents, and co-reactants, depending upon the desired characteristics of the final product. Such product has repeating urethane linkages in the molecule. Products of the invention are suitable for many uses, among which uses are as foams, plastics, adhesives, etc.

---

CROSS-REFERENCE TO RELATED APPLICATIONS

This application is a continuation-in-part of applicants' copending application Ser. No. 846,822 filed Oct. 16, 1959, now abandoned.

BACKGROUND OF THE INVENTION (1) Field of the invention

The present invention is primarily concerned with the field of art relating to synthetic resins, including pore-formed or cellular synthetic resins wherein lignin and organic polyisocyanates are the principal reactants, and the resins thus formed have repeating urethane linkages in the molecules.

(2) Description of the prior art

The reactivity of an organic polyisocyanate with various compounds to form polyurethanes is well known. For example, organic diisocyanates are known to react with compounds such as polyesters, polyethers, polyphenols, glycols and the like to form resinous products of varying consistency.

The simplest form of polyurethane is the linear one, which may be represented in its most elementary form by the following:

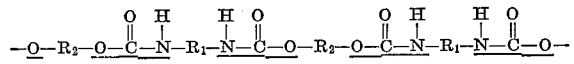

where the urethane linkage is underlined. Polyurethanes, by Bernard A. Dombrow, Reinhold Publishing Corporation, New York (1957).

The preferred polyurethanes of the present invention contained diurethane groups,

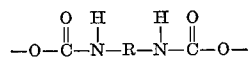

where R is a bivalent organic radical.

Thus, when an organic diisocyanate reactant is employed, polymerization or condensation of each isocyanate group of the diisocyanate molecule with a hydroxyl group, as discussed, results in the diurethane groups. When lignin is the only polyol present, each unattached valence in the diurethane group shown is attached to a carbon of a lignin molecule.

In these prior processes the starting materials such as the polyesters, polyethers, etc., are liquids and thus easily reactable with the diisocyanates.

Lignin is a solid material, usually available in powder form, and presents special problems with respect to reaction with an organic isocyanate because of its solid nature.

Lignin is an abundantly available material, and large quantities resulting from wood pulping operations are daily burned or simply discarded into waste streams. In spite of years of intensive research directed toward developing better utilization of this raw material, only a very few commercially useful products have been developed, none of them accounting for any significant volume.

Of the known prior art, Nichols U.S. Patent 2,854,422 discloses a composition comprising diisocyanate-linked elastomers and lignin wherein the lignin is added to the formed polyurethane and is merely present as a filler. Mills et al., U.S. Patent 2,906,718 discloses lignin-reinforced vulcanizable rubber stocks wherein the lignin takes the place of the usual carbon black reinforcing material. The patentees set forth as a possible theory of operation an interreaction of the polyisocyanate with the lignin molecule as well as with the rubber molecule.

SUMMARY OF THE INVENTION

The invention may be summarized as being broadly directed to a lignin polyurethane resin and to the method for forming the resin, which comprises reacting an intimate admixture of lignin and an organic polyisocyanate to produce a product containing repeating urethane linkages connecting the lignin with the isocyanate starting material molecules. To facilitate the reaction, the lignin may be dissolved in a solvent therefor. In another embodiment there is present in the reaction mixture a co-reactant which has a plasticizing action on the lignin. Dihydroxy organic compounds, such as polyalkylene glycols, are important plasticizing co-reactants, and others are disclosed infra, including a number of chain-extending agents having at least two active hydrogen atoms per molecule. Alternatively, inert plasticizers, such as didecyl-phthalate, may be used in the reaction mixture. Foaming agents, such as water, or compounds evolving carbon dioxide by reaction with isocyanate groups are utilized in forming the foamed, cellular synthetic resin lignin polyurethanes of the invention. The lignin polyurethanes of the invention are useful as foams, plastics, adhesives, and the like. The foams, for example, are suitable as substitutes for foam rubber for packaging, insulation, cushions, bedding, fillers, etc. The lignin polyurethanes can be used in lieu of the known polyurethane resins and foamed polyurethanes, and at less cost.

DESCRIPTION OF THE INVENTION AND OF SPECIFIC EMBODIMENTS THEREOF

Lignin as used herein and in the appended claims encompasses the commonly accepted generic meaning which covers lignin from any source. As is well known, lignin is an extremely complex, naturally occurring, solid polymer which is available from a number of sources. Lignin has been recovered by pulping wood with organic solvents (Pulp and Paper, vol. 1, Casey, Inter-Science Publishers, Inc., New York (1952), pp. 217–218). Lignin has also been recovered from wood by allowing a "brown rot" fungus to feed on the associated cellulose (Scientific American, vol. 199, No. 4, pp. 104–113). The last mentioned article also notes that, properly speaking, the term "lignin" refers not to a single compound but to a group of closely related compounds. This fact is also noted in Kirk-Othmer, Encyclopedia of Chemical Technology, vol. 8, p. 328. Lignin also varies slightly according to its source, the type of tree or plant, and it appears that the number of methoxy groups and even of the hydroxyl groups varies somewhat according to the source.

The only commercially important lignin sources are from commercial wood pulping operations. Wood pulping operations are divided into two broad groups, the alkali processes and the sulfite pulping processes. In the first group there are the sulphate process, the soda process, and the semi-sulphate process. This is the more important source of lignin, and the lignin recovered is in the form of a solid sodium salt or an acid precipitate of the sodium salt, and in this case the sodium has been removed from the hydroxyl groups. Lignin from the sulfite process usually contains sulphonate groups and is available in the form of sodium or calcium salts or in a form where the sulphonic acid groups are free. Sulfite lignin can also be partially or wholly desulphonated by heating with alkalis. Lignin in its natural state in the tree is generally believed to contain four hydroxyl groups per repeating unit, which repeating unit is generally thought to have a unit weight of about 840. However, depending upon the source of the lignin, sometimes one or more of the hydroxyl groups of the original natural compound are blocked or reacted by the various treatments employed to remove lignin from the associated cellulose. Also, by reaction with certain chemicals, some hydroxyl groups are esterified or etherified by reaction with an organic monocarboxylic acid or acid anhydride to form esters, or with an alkyl or aryl halide, such as methyl or ethyl chlorides, or phenyl chloride, or an aralkyl halide such as benzyl chloride, thus replacing a hydrogen or a portion of the hydroxyl groups with the corresponding hydrocarbon group, such as the methyl, ethyl, phenyl, or benzyl group, respectively. Also, hydroxyl groups of lignin are converted to methoxy groups by reaction with dimethyl sulphate. Further, esterification of a portion of the hydroxyl groups of lignin is effected by reacting the starting lignin compound with an organic acid or acid anhydride, such as acetic acid, formic acid, propionic acid, etc., and anhydrides of such acids.

In any case, for the practice of the present invention, no matter what the source of the lignin, there must be at least two free hydroxyl groups per lignin molecule for the preparation of polymeric products with repeating urethane linkages.

We have found that an alkali lignin (which has all of the hydroxyl groups present in a free, not a salt, form) is a particularly suitable material for forming the products of our invention according to the present process. One suitable commercial product of this type is known as Indulin A made by the West Virginia Pulp and Paper Company, New York, N.Y. This is a fairly pure product containing more than 98 percent organic material.

In general, lignin recovered in commercial operations designed to effect separation from cellulose and using inorganic chemical reagents, is a light-weight tan to dark brown amorphous powder.

Organic polyisocyanates are generally applicable in the process of the invention to produce a polymer containing multiple urethane linkages. The term "polyisocyanate" as used herein refers to a compound containing two or more isocyanato groups and there must be, of course, three or more total carbon atoms per molecule present. There is no critical upper limit to the number of carbon atoms present in the organic polyisocyanates employed according to the invention, but the polyisocyanates employed ordinarily contain up to 25 carbon atoms.

The invention is applicable to aliphatic, alicyclic, and aromatic polyisocyanates to form the polymeric products containing multiple urethane linkages. By the term "aliphatic, alicyclic, and aromatic" it is meant to define the character of the radical to which the isocyanate group is attached. Thus, the aliphatic, alicyclic, or aromatic group can contain, each of them, aliphatic, alicyclic, or aromatic substituents. Hydrocarbon polyisocyanates form a usually preferred group of polyisocyanates employed in the present invention. A particularly important group of polyisocyanates are hydrocarbon diisocyanates, that is, organic diisocyanates wherein the entire molecule (except for the isocyanato groups) is hydrocarbon (i.e., contains only carbon and hydrogen), including hydrocarbon aliphatic, cycloaliphatic, and aromatic diisocyanates. Hydrocarbon aliphatic, alicyclic, and aromatic triisocyanates are also useful, and, indeed, the invention is applicable to organic isocyanates containing more than three isocyanato groups.

The group of hydrocarbon aliphatic, cycloaliphatic, and aromatic diisocyanates includes, of course, the alkylene diisocyanates, cycloalkylene diisocyanates, and arylene diisocyanates. In particular, the arylene diisocyanates are often preferred because of their availability and their great reactivity, although, as is well known, the reactivity even between various arylene diisocyanates varies over a wide range, and this latter fact provides a method of obtaining control over the reaction and its rate in any given case.

It will be understood that organic polyisothiocyanates corresponding to the polyisocyanates mentioned herein are also applicable in the process of the invention. In fact, any polyisocyanate or polyisothiocyanate, or mixed polyisocyanate-polyisothiocyanate, for instance, of the general formula OCN—R—NCS in which R is a divalent organic radical will function for the purposes of the present invention.

Some representative examples of applicable polyisocyanates and polyisothiocyanates are:

2,4-tolylene diisocyanate
2,6-tolylene diisocyanate
diphenylmethane-4,4'-diisocyanate
3,3'-ditolylene-4,4'-diisocyanate
3,3'-dimethylphenylmethane-4,4'-diisocyanate
2,4-toluene diisocyanate dimer
m- and p-phenylene diisocyanate
4-chloro-1,3-phenylene diisocyanate
4,4'-biphenylene diisocyanate
1,5-naphthalene diisocyanate
1,4-cyclohexylene diisocyanate
4,4'-methylene-bis-(cyclohexyl isocyanate)
1,5-tetrahydronaphthalene diisocyanate dimers of the monomeric diisocyanates, such as 2,4-tolylene diisocyanate dimer di(isocyanato) ureas such as di(3-isocyanato-4-methylphenyl) urea disclosed in U.S. Patent 2,757,185 ethylene diisocyanate
methylene diisocyanate
p,p'-diphenyl-3,3'-dimethyl diisocyanate
p,p'-diphenyl-3,3'-dimethoxyl diisocyanate
propylene-1,3-diisocyanate
butylene-1,4-diisocyanate
pentylene-1,5-diisocyanate
heptylene-1,7-diisocyanate
octylene-1,8 diisocyanate
1,10-decylene diisocyanate
dodecylene-1,12-diisocyanate
propylene-1,2-diisocyanate
m- and p-xylylene diisocyanate
1-phenyl-1,2-diisocyanatoethane
1-isocyanato-6-isothiocyanatohexane
1,5-isocyanato-3-oxa-pentane
1,7-isocyanato-4-oxaheptane
para-isocyanatobenzyl isocyanate
para-phenylene diisothiocyanate
2,3-dimethyltetramethylene diisocyanate
p,p'-diphenylene diisothiocyanate
2-chlorotrimethylene diisocyanate
5-nitro-1,3-phenylene diisocyanate
meta-isocyanatocinnamyl isocyanate
bis-2-isocyanatoethyl ether or its corresponding sulfide
1,5-diisocyanato-3-pentanone
methylene diisothiocyanate
ethylene diisothiocyanate
p-phenylene diisothiocyanate
m-phenylene diisothiocyanate
2,3-dimethyltetramethylene diisothiocyanate 1,2,3,4-tetraisocyanato-butane
6-isocyanato-3-hexenyl isocyanate
hexamethylene-1-isocyanate-4-isothiocyanate
butylene-1,-2-diisocyanate
butylene-1,-3-diisocyanate
butylene-2,-3-diisocyanate
butylene 1,-3-diisothiocyanate
ethylidene diisocyanate
butylidene diisocyanate
heptylidene diisothiocyanate
cyclopentylene-1,3-diisocyanate
cyclohexylene-1,2-diisocyanate
cyclohexylene-1,2-diisothiocyanate
xylene-1,4-diisocyanate
xylene-1,-3-diisocyanate
4,4'-diphenylenepropane diisocyanate
xylylene-1,4-diisothiocyanate diisocyanates and diisothiocyanates containing heteroatoms such as $$SCNCH_2OCH_2NCS, \quad SCNCH_2CH_2OCH_2CH_2NCS$$
and
$$SCN(CH_2)_3-S-(CH_2)_3NCS$$

1,16-isocyanato-4-phenyl-6-methylhexadecane
1,5-isocyanato-6-hexyl-10-heptylnaphthalene
1,5-isocyanto-60-hexyl-10-heptyldecaline Another polyisocyanate which can be used to produce lignin polyurethane is lignin polyisocyanate. This can be made by chlorination of lignin and amination of the chlorinated lignin to produce amino lignin, and then reacting the latter with phosgene.

The polyisocyanates can also be employed in the form of their reaction products with phenols and thiols, which reaction products regenerate the diisocyanate in situ on heating. An example of such reaction product is:

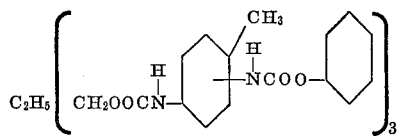

In addition to lignin and polyisocyanate, varying amounts of plasticizing materials, catalysts, solvents, co-reactants, and emulsifiers can be utilized in the reaction, as will be later more fully discussed.

In the following examples it will be noted that many of the examples contain reactants other than lignin and the polyisocyanates. Thus, the reactants according to the invention are the polyisocyanates and any compound which contains at least two active hydrogen atoms, including, of course, lignin. The term "active hydrogen atom" refers to hydrogen which, because of its position in the molecule, displays activity according to the Zerewitinoff test, as described by Kohler in J. Am. Chem. Soc., 49, 3181 (1927). The main reactants of the present invention are, of course, lignin and a polyisocyanate or polyisothiocyanate. The other reactants, defined as co-reactants herein, are those compounds having at least two active hydrogen atoms, other than lignin. For instance many of the products of these examples have been made with dihydroxy compounds, such as a polyethylene glycol having a molecular weight of three or four hundred, in addition to lignin and the polyisocyanate. The hydroxyl groups of the polyethylene glycol have, obviously, active hydrogen atoms. Therefore, this compound is a co-reactant with the polyisocyanate and lignin reactants. A product resulting from the reaction of lignin, a polyisocyanate, and a dihydroxy compound such as a polyethylene glycol will contain multiple linkages of the urethane type. On the other hand, if a product is made resulting, for instance, from the reaction of lignin, a polyisocyanate, and a co-reactant such as a dibasic acid, there will be present in the product both urethane linkages and amide linkages. Thus, as is well known, the reaction of an isocyanate group with a carboxylic acid group will result in an amide linkage. Certain other co-reactants with the polyisocyanate and lignin can result, in addition to the urethane linkages, in urea type linkages. However, all of the products prepared according to the present invention by reacting a polyisocyanate with lignin and with another active hydrogen-containing co-reactant are properly termed polyurethanes. Thus, these products contain lignin molecules chemically connected to other lignin molecules and molecules of the other active hydrogen-containing co-reactant by linkages containing the urethane group. It should be clearly understood, however, that the labeling of the various products in these examples as lignin polyurethanes does not imply that there are not nitrogen-containing linkages in the polymer product other than urethane linkages.

It will be noted in the following examples that many of the catalysts are also organic co-reactants since they also contain active hydrogen atoms. Where water is employed as a foaming agent it is, of course, also a reactant, although it is not an organic reactant, since it contains active hydrogen atoms and reacts with isocyanate groups to form carbon dioxide blowing agent.

Although an important broad object of the invention is to prepare new lignin polyurethanes of any composition, a most important object is to prepare lignin polyurethanes in particular which result from a mixture or bringing together of reactants as defined herein wherein the lignin reactant employed is at least 12 weight percent, and preferably at least 20 weight percent, of the total of the weight of the organic reactants (polyisocyanate, lignin, and other active hydrogen-containing compounds). The weight percent lignin shown in each of the following examples is expressed on this basis. The invention, of course, includes the important and economical embodiment of a lignin-polyurethane made from a polyisocyanate and lignin wherein the lignin is the sole polyhydroxy compound reactant employed.

In the foregoing discussion when speaking of the mixture of the polyisocyanate, lignin and the other active hydrogen-containing co-reactants, it will be understood from the following examples that this pertains to all of the materials mixed, but that the mixing of all of the materials does not need to take place at once. Thus, as will be seen, the lignin and the polyisocyanate can first be mixed and at least partially reacted and then the other co-reactant added, or the polyisocyanate and the co-reactant can be mixed and at least partially reacted and then the lignin added. Other variations are possible and are practiced as illustrated in the following specific examples.

It will be understood, of course, that the reaction product of lignin and an organic polyisothiocyanate is a lignin polythiourethane.

EXAMPLE 1.—PLASTIC

Lignin—27%

|  | Parts |
|---|---|
| Diphenyl methane-4,4'-diisocyanate | 67.0 |
| Indulin A. (alkali lignin) | 33.0 |
| 1,4-dioxane (solvent) | 480.0 |
| Triethanolamine (catalyst) | 14.8 |
| Ethylene glycol (plasticizer) | 7.4 |

The components quoted above are dissolved in the dioxane and agitated for one hour at room temperature in a 1000 ml. 3-neck flask. After storing the solution overnight, it is poured into an evaporating dish and the solvent driven off by heat. The resulting lignin polyurethane plastic has a softening point of 150° C., determined in the Fischer-Johns melting point apparatus. All melting points of these examples were determined in this manner.

EXAMPLE 2.—PLASTIC

Lignin—55%

| | Parts |
|---|---|
| Diphenyl methane-4,4'-diisocyanate | 41.0 |
| Indulin A (alkali lignin) | 59.0 |
| 1,4-dioxane | 450.0 |
| Triethanolamine (catalyst) | 7.0 |

The above ingredients are dissolved in the dioxane and the solution agitated five hours at room temperature in a 1000 ml. 3-neck flask. The solution gelled, was left standing overnight, and the solvent evaporated in an oven at 120° C. The resulting lignin polyurethane plastic had a softening point of 160° C.

EXAMPLE 3.—PLASTIC

Lignin—60%

| | Parts |
|---|---|
| Diphenyl methane-4,4'-diisocyanate | 27.0 |
| Indulin A (alkali lignin) | 73.0 |
| 1,4-dioxane | 450.0 |
| Poly(ethylene glycol) (400 avg. molecular wt.) | 14.2 |
| Triethanolamine (catalyst) | 7.1 |

These components are dissolved in the dioxane and mixed four hours at room temperature in a 100 ml. 3-neck flask. After standing in the reaction flask overnight, the solution is evaporated at 120° C. The resulting lignin polyurethane plastic has a softening point of 90° C. Infrared analysis showed absence of —OH groups, absence of isocyanate groups, and the presence of urethane linkages.

EXAMPLE 4.—PLASTIC

Lignin—13.4%

| | Parts |
|---|---|
| 80% tolylene-2,4-diisocyanate, 20% tolylene-2,6-diisocyanate | 80.0 |
| Indulin A (alkali lignin) | 20.0 |
| Poly(ethylene glycol) (400 average M.W.) | 50.0 |

These ingredients were agitated in a 500 ml. 3-neck flask at 100° C. without any solvent. However, after 20 minutes mixing during the warm-up period, an exothermic reaction started which heated the mixture to 150° C. and gelled the solution. The resulting lignin-polyurethane polymer had a softening point of 60° C.

EXAMPLE 5.—ADHESIVE

Lignin—27%

| | Parts |
|---|---|
| Diphenyl methane-4,4'-diisocyanate | 73.0 |
| Indulin A (alkali lignin) | 27.0 |
| 1,4-dioxane | 480.0 |

These components are dissolved in the dioxane in a 1000 ml. 3-neck flask and agitated for five hours at 80° C. After standing overnight in a closed flask, the solvent is evaporated to paste consistency. The lignin polyurethane product has the following properties:

(1) Softening point—no softening up to 280° C.
(2) Adhesion to glass—adheres well after oven drying at 120° C.
(3) Adhesion under pressure—paste is applied as bond between two ½ inch glass plates of 4 x 4 inch size, heated to 120° C. under 500 lbs. pressure for 20 minutes. A very good bond develops.

EXAMPLE 6.—ADHESIVE

Lignin—32%

| | Parts |
|---|---|
| Diphenyl methane-4,4'-diisocyanate | 67.0 |
| Indulin A (alkali lignin) | 33.0 |
| 1,4-dioxane | 480.0 |
| Triethanolamine (catalyst) | 4.0 |

These components are dissolved in the dioxane agitated for one hour at room temperature in a 1000 ml. 3-neck flask. The reaction product is precipitated with a nonsolvent, e.g., petroleum ether (190 gm.). After 10 minutes settling, the supernatant solvent is poured off and the remaining solution evaporated to paste form. The lignin polyurethane product has the following properties:

(1) Softening point—no softening at 300° C.
(2) Adhesion to glass—the paste was dried in a glass beaker at 120° C. It developed excellent adhesion, was very hard to remove, and chipped off glass upon removal.
(3) Adhesion upon air drying—the paste was air dried in a beaker and heated a short period to evaporate the last traces of solvent. The bond to the glass became so strong that the glass chipped during scraping.

EXAMPLE 7.—ADHESIVE

Lignin—27%

| | Parts |
|---|---|
| Diphenyl methane-4,4'-diisocyanate | 67.0 |
| Indulin A (alkali lignin) | 33.0 |
| 1,4-dioxane | 480.0 |
| Triethanolamine | 7.8 |
| Castor oil | 15.4 |

These ingredients are dissolved in the dioxane in a 1000 ml. 3-neck flask and agitated for one hour at room temperature. After standing in a stoppered flask overnight, the lignin polyurethane polymer solution is evaporated to paste form. Test results follow:

(1) Softening point—no softening below 270° C.
(2) Adhesion to glass—one portion of the paste was dried in a glass beaker for two hours at 120° C. The cement hardened and chipped the glass surface upon removal.
(3) Adhesion under pressure—a portion of the paste was sandwiched between two one-half inch glass plates of 4 x 4 inch size and pressed at 120° C. at 500 lbs. pressure for 20 minutes. The plates had to be broken in a trial to separate the bond.

EXAMPLE 8.—FLEXIBLE FOAM

| | Parts |
|---|---|
| (1) 80% tolylene - 2,4 - diisocyanate, 20% tolylene-2,6-diisocyanate | 80.0 |
| Indulin A (alkali lignin) | 20.0 |
| Poly(ethylene glycol) (400 average M.W.) | 40.0 |
| (2) N-ethyl morpholine | 2.0 |
| Sorbitan monolaurate | 2.0 |
| Water | 12.0 |

The ingredients in Group 1 are agitated for 10 minutes at 50° C. in a glass beaker. The foaming chemicals (Group 2) are added and mixed a few seconds at 40° C. After a cure of one hour at 120° C. a uniform, semi-resilient lignin polyurethane foam resulted having a density of 2.6 lb./cu. ft. results. Infrared analysis shows no OH groups are left in the product, and that urethane linkages are present. Also, some isocyanate groups were present, because of the large surplus used.

EXAMPLE 9.—FLEXIBLE FOAM

Lignin—34.6%

| | Parts |
|---|---|
| (1) 80% 2,4-tolylene diisocyanate, 20% 2,6-tolylene diisocyanate | 50.0 |
| (2 Indulin A (alkali lignin) | 17.0 |
| Poly(ethylene glycol) (400 average M.W.) | 20.0 |
| Mixed polyproplylene-ethylene glycol (average M.W. 2000) | 22.0 |
| (2) Indulin A (alkali lignin) | 33.0 |
| (3) N-ethyl diethanolamine | 0.7 |
| Polyoxyethylene sorbitan palmitate | 1.2 |
| Water | 5.0 |

The ingredients of Group 1 are agitated five minutes at 100° C. in a steel beaker. The additional lignin (Group 2) is admixed for one minute. The mixture is then cooled to 50° C., transferred to a fibre can, and foamed by addition of chemicals in Group 3. A soft flexible lignin polyurethane foam is obtained after a cure of one hour at 70° C. having a density of 4.3 lb. per cu. ft.

EXAMPLE 10.—FLEXIBLE FOAM

Lignin—38%

| | Parts |
|---|---|
| (1) Prepolymer: | |
| (a) Poly(propylene glycol) (average M.W. 2000) | 1740.0 |
| (b) 80% 2,4-tolylene diisocyanate, 20% 2,6-tolylene diisocyanate | 660.0 |
| (2) Prepolymer | 50.0 |
| Indulin A (alkali lignin) | 50.0 |
| Didecyl phthalate | 5.0 |
| 80% 2,4-tolylene diisocyanate, 20% 2,6-tolylene diisocyanate | 5.0 |
| Linear dimethyl siloxane oil | 5.0 |
| (3) Propylated novolak resin [1] | 17.0 |
| (4) N-ethyl morpholine | 2.0 |
| Triethyl amine | 0.7 |
| Water | 3.3 |

[1] Structure believed to be:

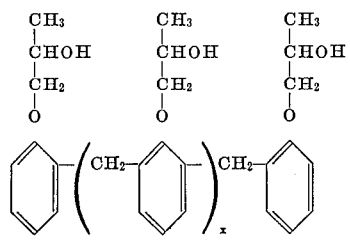

Where x=4 to 6

A prepolymer is prepared by heating the polyglycol and isocyanate (Group 1) for 5 hours at 125° C. under agitation in a 4000 ml. reaction flask. Fifty grams of this prepolymer is reacted with the other ingredients of Group 2 for 10 minutes at 120° C. in a steel beaker. The mixture is then cooled to 50° C. and the novolak resin plasticizer stirred in for one minute. Due to its aromatic nature, the novolak resin seems to increase the humidity resistance of the foam. For foaming, the chemicals of Group 4 are added and agitated 20 seconds at 50° C. After curing at 100° C., a soft flexible lignin polyurethane foam is obtained having a density of 11.4 lb./cu. ft.

EXAMPLE 11.—FLEXIBLE FOAM

Lignin—36%

| | Parts |
|---|---|
| (1) Prepolymer: | |
| (a) Poly(propylene glycol) (average M.W. 2000) | 1740.0 |
| (b) 80% 2,4-tolylene diisocyanate, 20% 2,6-tolylene diisocyanate | 660.0 |
| (c) Water (for thickening) | 7.0 |
| (2) Prepolymer | 50.0 |
| Indulin A (alkali lignin) | 50.0 |
| Didecyl phthalate | 4.2 |
| 80% 2,4-tolylene diisocyanate, 20% 2,6-tolylene diisocyanate | 8.3 |
| Linear dimethyl siloxane oil, 5 centistokes viscosity | 0.4 |
| (3) Propoxylated novolak resin (as in Ex. 10) | 21.0 |
| (4) N-methyl morpholine | 2.0 |
| Triethylamine | 0.7 |
| Water | 3.3 |

The ingredients of Group 1 are agitated for 3 hours at 120° C. in a 4000 ml. reaction kettle to prepare a prepolymer of 8.2% free isocyanate. Part of this prepolymer is reacted with the other components of Group 2 by agitating the blend for 10 minutes at 120° C. in a steel beaker. After cooling to 50° C. the resin of Group 3 is added by mixing for one minute. Through addition of the foaming chemicals (Group 4), a soft flexible lignin polyurethane foam develops which is cured one hour at 90° C. having a density of 9.0 lbs./cu. ft.

EXAMPLE 12.—FLEXIBLE FOAM

Lignin—37%

| | Parts |
|---|---|
| (1) Prepolymer: | |
| (a) Poly(propylene glycol) (average M.W. 2000) | 1540.0 |
| (b) 80% 2,4-tolylene diisocyanate, 20% 2,6-tolylene diisocyanate | 584.0 |
| (c) Water | 6.2 |
| (2) Prepolymer | 30.0 |
| 80% 2,4-tolylene diisocyanate, 20% 2,6-tolylene diisocyanate | 20.0 |
| Indulin A (alkali lignin) | 30.0 |

The production of a foam can be arrested at an intermediate stage to be stored for a limited time and to be foamed later. A prepolymer is prepared by agitating the ingredients of Group 1 for 3 hours at 120° C. in a 4000 ml. reaction kettle. Its free isocyanate content is 8%, its viscosity is 6800 c.p.s. (centipoise). The components of Group 2 are heated for 7 minutes at 120° C. in a steel beaker. The lignin reacted with only 42% of the theoretical amount of polyisocyanate. At this stage the product is a highly viscous brown syrup which can be modified with plasticizers or cross-bonding agents before foaming at a later date.

EXAMPLE 13.—RIGID FOAM

Lignin—21%

| | Parts |
|---|---|
| (1) 80% tolylene-2,4-diisocyanate, 20% tolylene-2,6-diisocyanate | 72.0 |
| Indulin A (alkali lignin) | 28.0 |
| (2) Poly(ethylene glycol) | 28.0 |
| N-ethyl morpholine | 2.7 |
| Polyoxyethylene sorbitan monopalmitate | 2.7 |
| Water | 16.0 |

The components of Group 1 are mixed in a glass beaker for 10 minutes at 70° C. Then the foaming chemicals (Group 2) are added under agitation. The resulting rigid lignin polyurethane foam is cured at 100° C.

Lignin—56%

| | Parts |
|---|---|
| (1) 80% tolylene-2,4-diisocyanate, 20% tolylene-2,6-diisocyanate | 30.0 |
| Indulin A (alkali lignin) | 15.0 |
| Diethylene glycol monolaurate | 23.0 |
| Dioxane (solvent) | 75.0 |
| (2) Indulin A (alkali lignin) | 55.0 |
| Triethanolamine | 0.75 |
| Polyoxyethylene sorbitan monopalmitate | 0.75 |
| Water | 1.50 |

After reacting the chemicals of Group 1 at 100° C. for one hour in a 250 ml. 3-neck flask with mechanical stirring, the whole mixture is transferred to a glass beaker and cooled to 30° C. The additional lignin and foaming chemicals are added, agitated 10–20 seconds, and the resulting foam is dried 3 hours at 120° C. After the evaporation of all the solvent, a hard, brittle lignin polyurethane foam results. Infrared analysis showed presence of urethane and —OH groups, and the absence of isocyanate groups.

EXAMPLE 15.—RIGID FOAM

Lignin—68%

While all other foams described here are based on a prepolymer (for flexible foams) or semiprepolymer method (for rigid foams), a few foams were made without preheating the lignin and polyisocyanate and plasticizer.

A solvent, like dioxane, is used to make the mixture fluid enough to be foamed. The formula used is the following:

| | Parts |
|---|---|
| Indulin A (alkali lignin) | 72.0 |
| 80% tolylene-2,4-diisocyanate, 20% tolylene-2,6-diisocyanate | 28.0 |
| Dioxane | 72.0 |
| N-ethyl morpholine (catalyst) | 3.0 |
| Polyoxyethylene sorbitan palmitate | 3.0 |
| Water | 17.0 |

The lignin, diisocyanate, and the dioxane are mixed at room temperature and the foaming chemicals added immediately. A rigid lignin polyurethane foam is produced.

EXAMPLE 16.—RIGID FOAM

Lignin—22%

| | Parts |
|---|---|
| (1) 80% tolylene-2,4-diisocyanate, 20% tolylene-2,6-diisocyanate | 60.0 |
| Indulin A (alkali lignin) | 8.0 |
| A mixed propylene-ethylene polyglycol (average M.W. 2000) | 40.0 |
| (2) Indulin A | 32.0 |
| Octakis (2-hydroxypropyl)sucrose | 40.0 |
| (3) Triethanolamine | 0.5 |
| Polyoxyethylene sorbitan monopalmitate | 1.0 |
| Water | 4.0 |

The reactants of Group 1 are agitated 15 minutes at 120° C. in a steel beaker. After cooling to 50° C., the reactants of Group 2 are added and mixed a few seconds. Finally, the foaming chemicals of Group 3 are mixed in with fast agitation. The product is cured 60 minutes at 120° C., resulting in a hard, rigid, lignin polyurethane foam having a density of 10.3 lb./cu. ft. Infrared analysis shows presence of free —OH groups, isocyanate groups, and urethane groups.

EXAMPLE 17.—RIGID FOAM

Lignin—34.6%

| | Parts |
|---|---|
| (1) 80% tolylene-2,4-diisocyanate, 20% tolylene-2,6-diisocyanate | 50.0 |
| Indulin A (alkali lignin) | 25.0 |
| Mixed polypropylene-ethylene glycol (average M.W. 2,100) | 39.0 |
| (2) Indulin A | 25.0 |
| (3) Triethanolamine | .7 |
| Polyoxyethylene sorbitan palmitate | 1.2 |
| Water | 5.0 |

The chemicals in Group 1 are reacted for 5 minutes at 120° C. in a steel beaker. The additional lignin (Group 2) is added and agitated for one minute. Then the mixture is cooled to 50° C. and the foaming chemicals (Group 3) added under agitation. After curing for 60 minutes at 120° C., a semirigid lignin polyurethane foam results whose density is 5.2 lbs./cu. ft.

EXAMPLE 18.—RIGID FOAM

Lignin—39%

| | Parts |
|---|---|
| (1) Prepolymer: | |
| (a) 80% 2,4-tolylene diisocyanate, 20% 2,6-tolylene diisocyanate | 220.0 |
| (b) Castor oil | 180.0 |
| (2) Prepolymer | 57.0 |
| Indulin A (alkali lignin) | 43.0 |
| Didecyl phthalate | 3.6 |
| Linear dimethyl siloxane oil, 1 centistoke viscosity | 0.4 |
| (3) N-ethyl morpholine | 2.9 |
| Triethylamine | 0.4 |
| Water | 3.0 |

The chemicals of Group 1 are agitated for 3 hours at 120° C. in a 1000 ml. 3-neck flask to form a prepolymer of a viscosity of 21,000 cps. (centipoise). A part of this prepolymer is reacted with the components of Group 2 for 10 minutes at 120° C. in a steel beaker. The mixture is cooled to 50° C., transferred to a fibre can, and foamed by stirring with the chemicals of Group 3 for 20 seconds. After curing the product one hour at 90° C., a rigid lignin polyurethane foam is obtained whose density is 4.9 lbs./cu. ft.

EXAMPLE 19

| | Parts |
|---|---|
| Triphenyl methane triisocyanate | 24.6 |
| Indulin A (alkali lignin) | 17.8 |
| Dioxane solvent | 414.0 |

The triisocyanate is stirred into the solution of lignin in dioxane. The solution is agitated 2 hours at 100° C. The lignin polyurethane is precipitated from solution with toluene and filtered. After rinsing with ether and oven drying, a reddish-brown lignin polyurethane powder results.

Infrared tests indicate: some unreacted hydroxyl from lignin, no unreacted isocyanate, and strong urethane bands.

EXAMPLE 20

| | Parts |
|---|---|
| (1) Prepolymer, prepared from 263 parts poly (propylene glycol) of avg. M.W. 2000, 80 parts 2,4-tolylene diisocyanate, 20 parts 2,6-tolylene diisocyanate, and 1.04 parts water, using 3 hour reaction at 120° C. | 50.0 |
| Indulin A (alkali lignin) | 50.0 |
| Total lignin and lignin polyurethane prepolymer | 100.0 |
| (2) Didecylphthalate | 8.3 |
| Mixture of 80% 2,4-tolylene diisocyanate, 20% 2,6-tolylene diisocyanate | 33.4 |
| Succinic acid | 8.3 |
| Linear dimethylsiloxane oil | 0.5 |
| (3) Water | 3.3 |
| N-methylmorpholine | 2.0 |
| Triethylamine | 0.7 |

The reactants of Groups 1 and 2 are mixed for 5 minutes at 100° C. After cooling to room temperature the chemicals of Group 3 are added and mixed for 30 seconds. A hard, brittle lignin polyurethane foam results which is cured 2 hrs. at 100° C.

EXAMPLE 21

| | Parts |
|---|---|
| (1) Prepolymer of Example 20 | 50.0 |
| Indulin A (alkali lignin) | 50.0 |
| Total lignin and prepolymer | 100.0 |
| (2) Didecylphthalate | 8.3 |
| Mixture of 80% 2,4-tolylene diisocyanate, 20% 2,6-tolylene diisocyanate | 33.4 |
| Resorcinol | 8.3 |
| Linear dimethylsiloxane oil | 0.5 |
| (3) Water | 3.3 |
| N-methylmorpholine | 2.0 |
| Triethylamine | 0.7 |

The components of Groups 1 and 2 are mixed and heated 5 minutes at 100° C. After cooling to room temperature, the chemicals of Group 3 are added and stirred 30 seconds. The resulting semiflexible lignin polyurethane foam is cured 2 hours at 100° C.

EXAMPLE 22

|  | Parts |
|---|---|
| (1) Lignin polyurethane prepolymer is made by agitating 70.4 parts of 2,4-tolylene diisocyanate and 17.6 parts of 2,6-tolylene diisocyanate with 48 parts of Indulin A in 52 parts dioxane solvent at 100° C. This reaction gels in 30 minutes. The solution is then evaporated in an oven to a hard solid which is ground to a fine powder in a ball mill | 30 |
| Prepolymer, prepared from 263 parts poly(propylene glycol) of avg. M.W. 2000, 80 parts 2,4-tolylene diisocyanate, 20 parts 2,6-tolylene diisocyanate, and 1.04 parts water, using a 3 hour reaction at 120° C. | 30 |
| Propylated novolak resin of Example 10 | 5 |
| Mixture of 80% 2,4-tolylene diisocyanate, 20% 2,6-tolylene diisocyanate | 7 |
| Linear dimethylsiloxane oil | 0.3 |
| (2) Water | 2 |
| Methylmorpholine | 1.2 |
| Triethylamine | 0.4 |

The lignin polyurethane prepolymer, the glycol prepolymer, and the rest of the components in Group 1 are mixed at room temperature for 2 minutes. Then the foaming chemicals are added and agitated for 20 seconds. After 2 hours curing at 100° C., a soft, rubbery, lignin polyurethane foam results.

The infrared test of the lignin polyurethane prepolymer shows all hydroxyls of the lignin reacted (no band at 2.95 microns), some surplus of isocyanate (4.4 microns) and urethane bands at 5.8 and 6.6 microns.

EXAMPLE 23

|  | Parts |
|---|---|
| (1) Lignin prepolymer, prepared by reacting the following chemicals for 1½ hours at 100° C.: 528 parts of 2,4-tolylene diisocyanate, 132 parts of 2,6-tolylene diisocyanate, 480 parts of Indulin A (alkali lignin), 3 parts of N-ethyldiethanolamine in 1034 parts dioxane solvent. The resulting gel is precipitated with toluene, filtered, washed with ether and oven dried | 30 |
| Poly(propylene glycol) (avg. M.W. 2000) | 40 |
| Propylated novolak resin of Example 10 | 5 |
| Octakis (2-hydroxypropyl) sucrose | 5 |
| Didecylphthalate | 10 |
| Mixture of 80% 2,4-tolylene diisocyanate, 20% 2,6-tolylene diisocyanate | 45 |
| Linear dimethylsiloxane oil | 0.3 |
| (2) Water | 2 |
| N-methylmorpholine | 1.2 |
| Triethylamine | 0.4 |

The lignin polyurethane prepolymer is mixed with the glycol and the remaining components of Group 1, and heated to 100° C. for 3 minutes. The mix is stirred 2 more minutes after removal from the hot plate. After cooling to room temperature, the foaming chemicals are added and the whole mixture stirred for 5–10 seconds. The resulting lignin polyurethane foam, after curing for 2 hours at 100° C., is semi-rigid light colored and has good cohesion.

EXAMPLE 24

|  | Parts |
|---|---|
| (1) Prepolymer, prepared from 263 parts poly (propylene glycol) of avg. M.W. 2000, 80 parts 2,4-tolylene diisocyanate, 20 parts 2,6-tolylene diisocyanate, and 1.04 parts water, using a 3-hour reaction at 120° C. | 57 |
| Sodium lignosulfonate (moist) | 43 |
| (2) Didecylphthalate | 7.1 |
| Mixture of 80% 2,4-tolylene diisocyanate, 20% 2,6-tolylene diisocyanate | 43 |
| Propylated novolak resin of Example 10 | 7.1 |
| Linear dimethyl siloxane oil | 0.7 |

The components of Groups 1 and 2 are heated for 2 minutes at 60° C. During stirring, the foam started to rise without any addition of water or catalyst. This phenomenon was traced back to the moisture occluded in the lignin and to the alkaline reaction of the sodium sulfonate groups.

A soft, semiresilient lignin polyurethane foam is obtained, which is cured 2 hours at 100° C. Infrared tests show positive urethane bands.

EXAMPLE 25

|  | Parts |
|---|---|
| (1) Prepolymer from Example 24 | 58 |
| Calcium lignosulfonate | 42 |
| Total lignin and prepolymer | 100 |
| (2) Didecylphthalate | 7.1 |
| Propylated novolak resin of Example 10 | 7.1 |
| Mixture of 80% 2,4-tolylene diisocyanate, 20% 2,6-tolylene diisocyanate | 28.6 |
| Linear dimethylsiloxane oil | 0.7 |
| (3) Water | 2.9 |
| N-methylmorpholine | 1.7 |
| Triethylamine | 0.6 |

The ingredients of Groups 1 and 2 are heated together to 100° C. for 10 minutes, are then cooled to room temperature and the foaming chemicals (Group 3) added. After 20 seconds stirring a uniform, semirigid lignin polyurethane foam is obtained.

EXAMPLE 26

|  | Parts |
|---|---|
| (1) Prepolymer prepared as in Example 24 | 57 |
| Crude sulfite lignin powder containing 44% tannin | 43 |
| (2) Didecylphthalate | 7.1 |
| Propylated novolak resin of Example 10 | 7.1 |
| Linear Dimethylsiloxane oil | 0.7 |
| Mixture of 80% 2,4-tolylene diisocyanate, 20% 2,6-tolylene diisocyanate | 43.0 |
| (3) Water | 2.9 |
| Methylmorpholine | 1.7 |
| Triethylamine | 0.6 |

The reactants of Groups 1 and 2 are heated 5 minutes at 100° C., are then cooled to room temperature and the foaming chemicals (Group 3) added. After 20 seconds stirring, a light-colored, semirigid lignin polyurethane foam develops, which is cured 2 hours at 100° C. Infrared tests show positive urethane bands.

EXAMPLE 27

|  | Parts |
|---|---|
| (1) Prepolymer as in Example 24 | 50 |
| Phenoxy lignin [1] | 50 |
| Total of lignin and prepolymer | 100 |
| (2) Didecylphthalate | 16.7 |
| Mixture of 80% 2,4-tolylene dissocyanate, 20% 2,6-tolylene diisocyanate | 33.4 |
| Propylated novolak resin of Example 10 | 3.3 |
| Linear dimethyl siloxane oil | 0.8 |
| (3) Water | 3.3 |
| N-methylmorpholine | 2.0 |
| Triethylamine | 0.7 |

[1] Product of West Virginia Pulp and Paper Company, New York, N.Y., believed to have a portion of the hydroxyl hydrogens of lignin replaced by phenyl radicals.

The ingredients of Groups 1 and 2 are heated for 10 minutes at 100° C. After cooling to room temperature, the foaming chemicals are added and agitated 30 seconds. A semirigid lignin polyurethane foam results which is cured 2 hours at 100° C.

Infrared tests show positive urethane bands.

From the foregoing examples it will be apparent that lignin-polyurethane polymer products derived from the reaction of lignin with a polyisocyanate may be classified as foams, plastics (including elastomeric products) or adhesives.

In the process of the invention it is within the scope of the process to employ an inert plasticizer such as the didecylphthalate set forth in the Example 11. It is also within the scope of the invention to employ a solvent for lignin which is inert to the action of the polyisocyanate, and examples of such solvents include dimethyl formamide, tetrahydrofuran and dioxane. Indeed the use of such solvents is one important method of obtaining proper reaction between the solid powdered lignin and the isocyanate. Another method of obtaining the proper reaction is to employ a co-reactant which also has a plasticizing action on the lignin and which results in a final product which is in effect plasticized and less rigid than products not employing such plasticizing co-reactant. The dihydroxy organic compounds such as the polyalkylene glycols are important plasticizing co-reactants. Other important plasticizing co-reactants include castor oil and dimerized linoleic acid. Other examples include 8-hydroxypropyl sucrose, polyethylene glycols, polypropyleneethylene glycols, and a triol resulting from the condensation of several moles of ethylene oxide or propylene oxide with a mole of 2,4,6-hexanetriol. One or another of these types of plasticizers are important in the production of flexible foams.

While the organic polyols comprise a preferred co-reactant in the process of the invention because of their plasticizing action and because the linkages formed by their use are desirable urethane linkages, it is also within the scope of the invention to employ other compounds as co-reactants which contain at least two active hydrogen atoms as before defined. Co-reactants containing at least two active hydrogen atoms can be termed chain-extending agents because they serve to extend the polymer chains which are formed between the polyisocyanate and the lignin. The particularly useful chain-extending agents containing at least two active hydrogen atoms are those in which the active hydrogen atoms are attached directly to oxygen, nitrogen, or sulphur. In particular, the groups containing the active hydrogen atoms are ordinarily —OH, —SH, —NH—, —NH$_2$, —COOH, —CONH$_2$, —CONHR where R represents an organic radical, —SO$_2$OH, —SO$_2$NH$_2$ or —CSNH$_2$. Examples of such chain-extending agents which are useful co-reactants are water, hydrogen sulfide, betahydroxypropionic acid, 1,2-ethanedisulphonic acid, hexamethylene glycol, 1,4-cyclohexanedisulfonamide, 1,3 - propanedisulfonamide, adipic acid, terephthalic acid, hydroquinone, succinic acid, succinamide, ethylene glycol, diethylene glycol, aminopropionic acid, 4-hydroxybenzoic acid, ethanolamine, ethylene diamine, 1,5 - pentanedisulfonamide, 2,4 - tolylene diamine, bis(4 - aminophenyl)methane, m - phenylene diamine, 1,4-butanediol, diethanolamine, adipamide, 1,2-ethane dithiol, 4-aminobenzoic acid, propylene diamine, 4-aminobenzamide, sulfanilamide, and 1,5 - mercapto-2-oxapentane.

Certain of the chain-extending agent co-reactants serve as foaming agents because they evolve carbon dioxide by reaction with isocyanate groups. Examples are compounds containing a carboxylic acid or a sulfonic acid group. Water, as is well known, also reacts with isocyanato groups to produce carbon dioxide. Such agents can be employed to produce foaming, or an unfoamed product can be produced by removal of the evolved carbon dioxide from the reaction product as it is produced. Of course, carboxylic acids or sulfonic acids containing only one group containing an active hydrogen atom as defined can be employed for the purpose of providing carbon dioxide for foaming.

With respect to the ratio of polyisocyanate to total active hydrogen-containing compounds employed in the process of the invention, it will be understood that it is theoretically possible for each active hydrogen atom to react with one isocyanato group and to choose the proportions stoichiometrically such that no active hydrogen atom is left in any reactant, including lignin, and no unreacted isocyanato group is left in the final product. This complete reaction of each of these types of reactive groups is seldom achieved in practice; indeed, it is seldom attempted. However, it is often desired that the final product contain no unreacted isocyanato groups, or isocyanato groups (O=C=N—) amounting at the most to 10 weight percent of the final product. Complete reaction of the isocyanato groups can be achieved, of course, by using sufficient excess of the active hydrogen containing compounds. It should be noted, however, that it appears from our investigations that a portion of the lignin hydroxyl groups are less reactive than others. In many of the polyurethanes made according to the present process the final product has unreacted hydroxyl groups even though there are also unreacted isocyanato groups present.

It will thus be seen that no particular range of ratios of isocyanate compounds can be set forth, particularly in view of the fact that this ratio will depend, of course to a great extent upon the particular reactants involved, and the amount of co-reactants employed. It can be stated, however, that most products are made with a maximum 3 grams equivalents of the isocyanate per 100 grams of lignin. A gram equivalent is the gram molecular weight of the isocyanate divided by the number of isocyanato groups in the molecule. Of course, in order to achieve products which are mostly usually preferred, these are formed by mixing or bringing together lignin and the other organic reactants wherein the lignin reactant employed is at least 12, most preferably at least 20, weight percent of the total of the weight of the organic reactants (polyisocyanate, lignin, and other active hydrogen-containing compounds). This ratio will vary greatly with the molecular weight and the amount of the active hydrogen-containing compounds employed other than lignin. Also, it should be noted that in the case of reaction between a diisocyanate and lignin having a unit weight of about 840, four gram equivalents of an isocyanate would completely satisfy and theoretically convert the assumed four hydroxyl groups of the lignin unit. This amounts to less than one-half gram equivalent per 100 grams of lignin. Generally, the products of the invention are made employing at least 0.05 gram equivalents of polyisocyanate per 100 grams of lignin, more usually at least 0.3 gram equivalents of polyisocyanate per 100 grams of lignin.

In the preparation of lignin-polyurethane foams, the particular polyisocyanate, plasticizer, co-reactant, catalyst, emulsifier, and the amount of water employed plus the reaction times and ratio of polyisocyanate to lignin all having a bearing on whether the foam which is obtained is rigid, resilient, flexible, dense, etc. For example, in a given case, a low ratio of polyisocyanate to lignin raises the viscosity so high due to the powder nature of lignin that a solvent, such as dioxane is necessary for mixing and proper reaction. Of course, more polyisocyanate can be employed but this is the most expensive reactant in the process and increases the cost of the end product. Moreover, if excessive polyisocyanate is used, a hardening of the foam results due to cross-linking which is undesirable for certain applications.

In addition, the type of polyisocyanate employed is also an important factor. As is well known, 2,4-tolylene diisocyanate reacts slower and yields softer foams than a blend of the 2,4-tolylene diisocyanate (80%) and 2,6-tolylene diisocyanate (20%), which is the diisocyanate most employed in preparing polyurethanes and is also the cheapest.

Although catalysts are not always employed, they are usually employed in making foams and plastics in amounts varying from 0.5 to 2.5 weight percent of the total reactants. Catalysts applicable include N-ethyl morpholine, triethylamine, and triethanolamine. Any other catalysts known in the art for promoting reaction between an organic polyisocyanate and an active hydrogen-containing compound can be used.

In the preparation of lignin-polyurethane adhesives, best results are usually obtained employing higher amounts of catalysts, generally from 2.5 to 15 percent of the total weight of lignin and isocyanate.

Although not absolutely necessary, it is often advantageous to employ an emulsifier in amounts varying from 0.5 to 2.5 percent of total reactants, with the average level being most generally around 1 percent. Among the emulsifiers found to be satisfactory are Tween 40 (a sorbitan monopalmitate polyoxyethylene derivative), sorbitan monolaurate, and the linear dimethyl siloxanes.

In preparing foams, the usual foaming agent employed is water and it is most usually employed in amounts from 1 to 17 percent of organic reactants to produce carbon dioxide for expansion of foam, but, in generally, amounts varying from about 3 to 7 percent are usually found to be sufficient.

The lignin-polyurethanes of the present invention find utility as substitutes for foam rubber, adhesives, molding compounds, packaging, insulation, and bedding fillers. These lignin-polyurethanes have a marked economic advantage over polyurethanes derived from, for example, polyethers and isocyanates. This stems from the lost cost of the active hydrogen-containing lignin employed in the present invention.

Lignin polyurethane products can also be produced by reacting lignin with phosgene in an inert diluent such as dioxane and then reacting amino lignin therewith, thus:

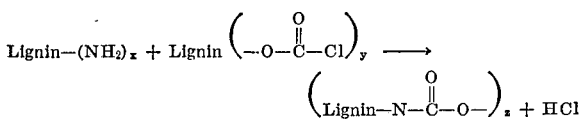

where $x$, $y$ and $z$ are each positive integers of at least 2.

Lignin polyurethane products can also be prepared by reacting amino lignin and an organic polychloroformate, such as dichloroformate, thus:

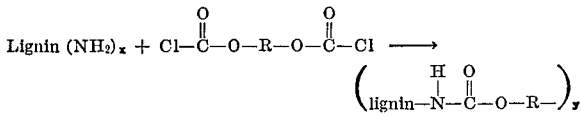

where $x$ and $y$ are each positive integers of at least 2 and R is a divalent organic radical, including a divalent aliphatic, cycloaliphatic or aromatic radical. An example is butylene-1,4-chloroformate reacted with amino lignin.

It will be apparent to those skilled in the art that variations and modifications of the invention can be made from a study of the foregoing disclosure. Such variations and modifications are believed to be clearly within the spirit and scope of the invention.

What is claimed is:

1. A method which comprises reacting lignin dissolved in a solvent therefor with an organic polyisocyanate that is in intimately dispersed relation with respect to the dissolved lignin.

2. A method for preparing a lignin polyurethane, which comprises contacting an intimate admixture of lignin and an organic polyisocyanate as the essential organic reactive ingredients, and allowing reaction to take place, the lignin employed in said contacting being at least 12 weight percent of the organic reactants employed, said lignin being dissolved in a solvent therefor.

3. A method for preparing a lignin polyurethane which comprises intimately admixing and contacting lignin and a polyalkylene glycol with a compound selected from the group consisting of an organic polyisocyanate and an organic polyisothiocyanate and allowing the reaction to take place, the lignin employed in said contacting being at least 12 weight percent of the total organic reactants employed.

4. A method of making a lignin polyurethane cellular foam comprising intimately admixing and contacting lignin and a polyalkylene glycol with an organic polyisocyanate in the presence of a compound yielding by chemical reaction with isocyanate groups a different chemical compound which is a gaseous foaming agent, and allowing reaction and foaming to occur, thereby producing a foamed polyurethane, the foaming agent being released as a gas during said reaction.

5. A method of preparing cellular synthetic resin which comprises reacting lignin dissolved in a solvent therefor with an organic polyisocyanate that is in intimately dispersed relation with respect to the dissolved lignin, wherein during said reaction a gas is generated within the reaction mixture in the form of a multiplicity of bubbles that are retained in the synthetic resin produced as a result of said reaction.

6. A method according to claim 5 wherein an organic polyhydroxy compound is present as a co-reactant.

7. A method of producing a synthetic resin which comprises dissolving lignin in a volatile solvent to form a liquid solution and reacting said lignin while dissolved in said liquid solution with an organic polyisocyanate by intimately dispersing said polyisocyanate in said solution for resin-forming reaction with said lignin.

8. A method of producing a synthetic resin which comprises reacting an organic polyisocyanate with both
   (1) lignin and
   (2) an organic polyhydroxy compound comprising a plurality of hydroxyl groups reactive with the isocyanato groups of an organic polyisocyanate
while
   (1) said lignin and said polyhydroxy compound are in liquid mutual solution and
   (2) said organic polyisocyanate is in intimately dispersed relationship with respect to said lignin in said solution.

9. The method as defined in claim 8 wherein said other organic compound is a polyalkylene glycol, said lignin being present in an amount of at least 12 weight percent of the total organic reactants present.

10. A method for preparing a lignin polyurethane which comprises intimately admixing and contacting lignin and a polyalkylene glycol with an organic polyisocyanate and allowing reaction to take place, said polyisocyanate being employed in a ratio of from 0.05 to 3 gram mole equivalents per 100 grams of lignin but less than an amount leaving over 10 weight percent unreacted isocyanato groups in the polymeric structure of the product, the lignin employed in said contacting being at least 12 weight percent of the total organic reactants employed in said reaction.

11. A cellular foam polyurethane which is an interpolymer of lignin, a polyalkylene glycol and an organic diisocyanate, said interpolymer containing at least 12 weight percent combined lignin.

12. A lignin polyurethane which is a product of claim 10.

13. An organic polyurethane comprising the polymeric reaction product of (1) an organic polyisocyanate, (2) lignin and (3) a polyalkylene glycol, the lignin being at least 12 weight percent of the organic reactants.

14. A synthetic resin comprising the product of resin-forming chemical reaction between dissolved lignin contained in a liquid solution of said lignin in a solvent therefor and an organic polyisocyanate intimately dispersed in said solution.

15. A synthetic resin according to claim 14 which is in the form of a foam.

16. A synthetic resin comprising the product of resin-forming chemical reaction of an organic polyisocyanate with a lignin and with an organic polyhydroxy compound that are in a liquid mutual solution of said lignin and said compound with said organic polyisocyanate intimately dispersed therein.

References Cited

UNITED STATES PATENTS 2,854,422  9/1958  Nichols _____ 260—17.5
2,906,718  9/1959  Mills et al. _____ 260—17.5

HOSEA E. TAYLOR, Primary Examiner

M. J. WELSH, Assistant Examiner

U.S. Cl. X.R.

260—17.5, 124, 77.5

UNITED STATES PATENT OFFICE
CERTIFICATE OF CORRECTION

Patent No. 3,577,358              Dated May 4, 1971

Inventor(s) Thomas R. Santelli et al.

It is certified that error appears in the above-identified patent and that said Letters Patent are hereby corrected as shown below:

Column 10, after line 45, insert -- EXAMPLE 14 - RIGID FOAM --.

Signed and sealed this 2nd day of November 1971.

(SEAL)
Attest:

EDWARD M. FLETCHER, JR.          ROBERT GOTTSCHALK
Attesting Officer                Acting Commissioner of Patents